INVENTOR.
EUGENE L. BRILL
BY Baldwin, Doran & Egan
ATTORNEYS.

April 28, 1970  E. L. BRILL  3,508,663
FLEXIBLE ELONGATED GENERALLY CYLINDRICAL COLLECTOR
FOR HYDROPHOBIC MATERIALS
Filed Oct. 10, 1968  5 Sheets-Sheet 2

INVENTOR.
EUGENE L. BRILL
BY
Baldwin, Doran & Egan
ATTORNEYS.

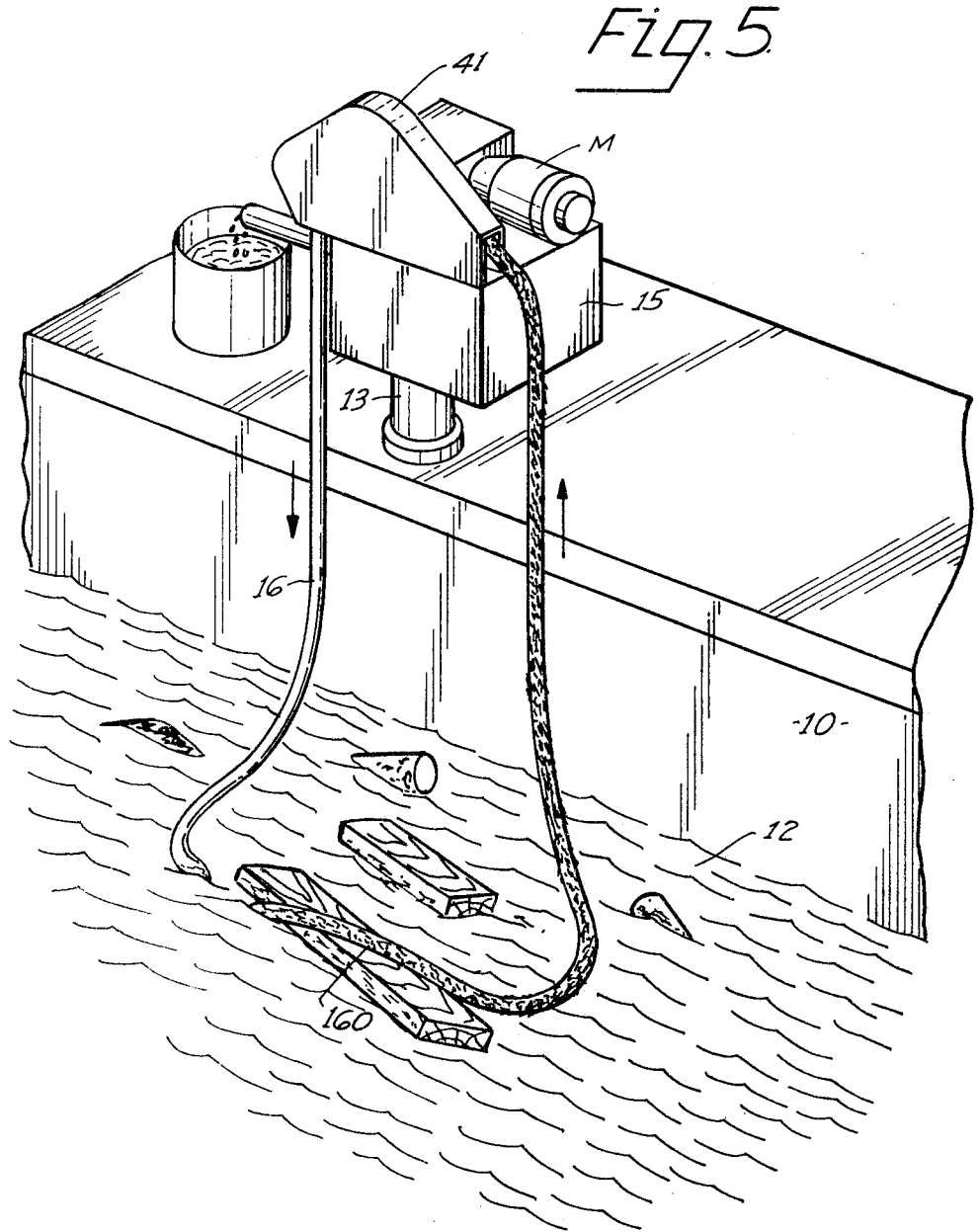

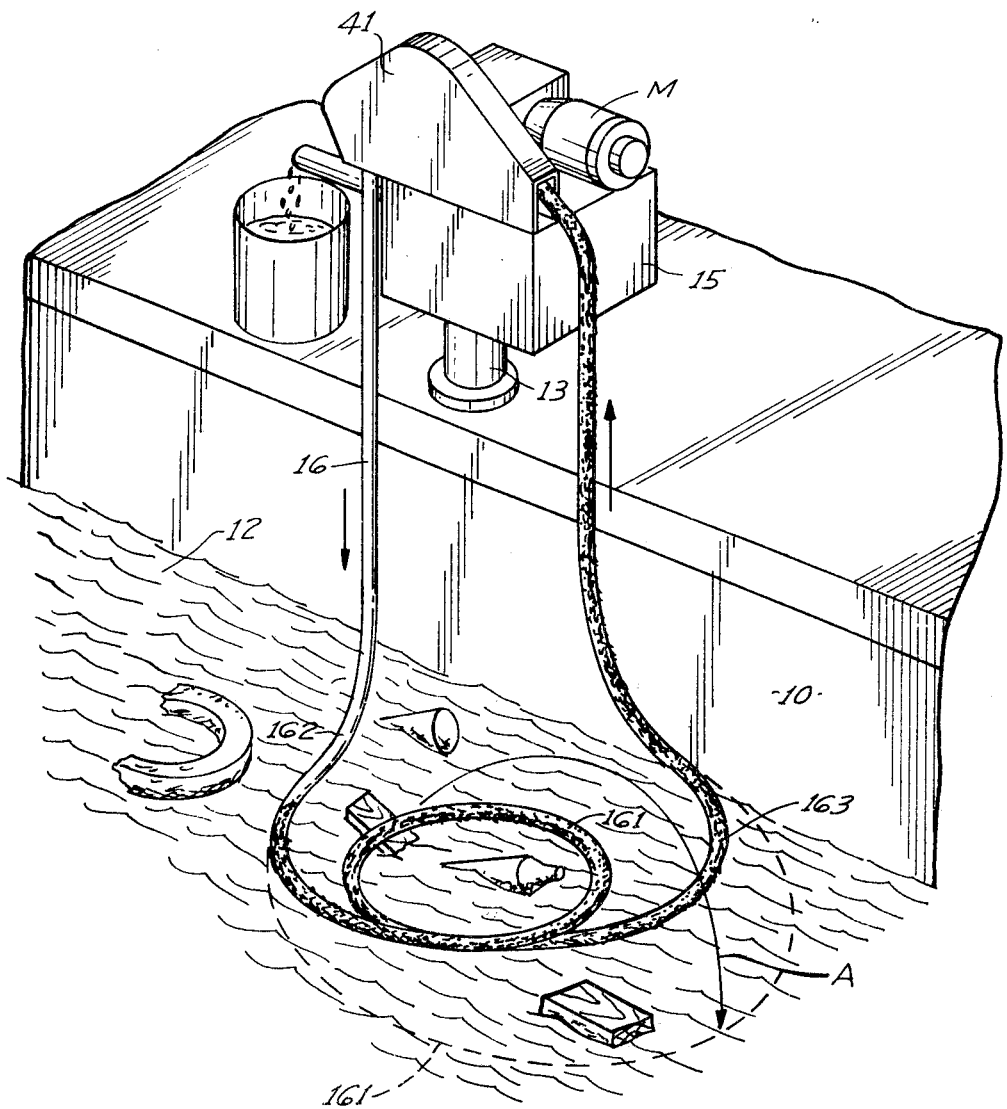

United States Patent Office 3,508,663
Patented Apr. 28, 1970

3,508,663
**FLEXIBLE ELONGATED GENERALLY CYLIN-
DRICAL COLLECTOR FOR HYDROPHOBIC
MATERIALS**
Eugene L. Brill, 1803 W. Royalton Road,
Cleveland, Ohio 44141
Continuation-in-part of application Ser. No. 601,937,
Dec. 15, 1966. This application Oct. 10, 1968, Ser.
No. 766,399
Int. Cl. B01d 35/16, 33/36, 33/04
U.S. Cl. 210—396                    12 Claims

ABSTRACT OF THE DISCLOSURE

A flexible, hose-like elongated collector adapted for collecting hydrophobic materials floating in a layer on a reservoir of water or the like is formed into an endless loop which passes into or upon the liquid in the reservoir, then upwardly and out through or away from the layer of hydrophobic material which collects on the surface of collector, after which a doctor blade helically wound around the collector scrapes the coated material therefrom. An improvement of this collector is that the sole support for the collector loop is a drive pulley located entirely above the liquid in the reservoir, there being nothing of the collector means passing beneath or near the water except the collector hose or loop itself. Another improvement is the provision of a single separate loop of flexible material of circular cross section capable of whipping about in a random manner from its overhead suspension. Drive teeth for the collector loop are provided about the driving pulley or chain alternately on opposite sides of the driving element so that the collector loop passes in a wavy manner around the periphery of the driving element being forced alternately to one side or the other as it is threaded between the collector drive teeth. This collector loop may be used in several ways. If the distance from the sole support of the collector loop down to the top level of the liquid in the reservoir is short, then the collector loop is of sufficient stiffness that the driving element can push the collector loop beneath the surface of the liquid in the reservoir, after which it again comes out of the liquid and back to the sole support. Another use of the collector loop is to provide a relationship between the sole support and the top level of the liquid in the reservoir so that there is sufficient length of the collector loop that a portion of it may float upon the liquid in the reservoir to pick up the hydrophobic material, after which it returns to the driving element by way of the doctor blade which removes the hydrophobic material from the collector loop. Another use of the device is to provide a length of the collector loop floating on the liquid in the reservoir sufficiently long to form a generally circular coil on the liquid with the approaching portion of the loop overlying the departing portion thereof.

This application is a continuation-in-part of my co-pending application Ser. No. 601,937, filed Dec. 15, 1966 now abandoned for Flexible Elongated Generally Cylindrical Collector for Hydrophobic Materials.

This invention relates to improvements in a flexible elongated generally cylindrical collector for hydrophobic materials and, more particularly, to an endless loop collector which passes into or upon liquid in a reservoir having a floating layer of the hydrophobic material, then upwardly and out through or away from the layer whereby the layer material is coated on the surface of the collector loop, after which doctor blade means scrapes the coated collector to remove the material therefrom.

One of the uses of this invention would be the removal of an oil layer on a water reservoir to avoid water pollution.

Another use of this invention is to clean up a coolant used either in metal rolling or in metal machining. In metal rolling, oil and fine metallic parts are washed off in the cooling water and may cause difficulties in the operation of the system unless the oil and the metallic particles are removed from the coolant. In metal machining, the coolant usually consists of water with an additive of some soluble oil or synthetic material to give it the ability to keep the machined part and the machine itself clean and free from rust as well as to keep it cool. Many of the modern coolant systems incorporate filters and heat exchangers to keep the coolant clean and cool. Oil and grease get into the coolant from leaks on the machines or from the parts being machined. This is commonly called tramp oil. Tramp oil clings to the parts and to the machine causing quality problems. It also plugs the filters raising filter costs tremendously. It also coats heat exchangers, reducing their efficiency. Tramp oil also has a tendency to attach fine metallic particles, oxides, carbon, lint and other finely divided contaminants to its molecules causing them to float to the surface sometimes in just the oil layer itself but more often in a froth layer. The present invention is being successfully operated in an automobile plant for removing tramp oil which is heavily loaded with graphite and fine metallic particles from a large central coolant reservoir. It is also being successfully used in the reservoir of a stainless steel rolling mill to remove a tramp oil froth containing metal flakes, oxides and carbon. Another successful use of this invention is immediately under a metal rolling mill to skim off the tramp oil before it enters the duct leading to the reservoir. This removes the oil before turbulence in the duct could mix it with the coolant.

Another use of the present invention is in meat processing plants to skim off fats and grease from floor wash water before it leaves the plant.

Other objects and advantages of this invention will be apparent from the accompanying drawings and description and the essential features will be set forth in the appended claims.

Figure 1:
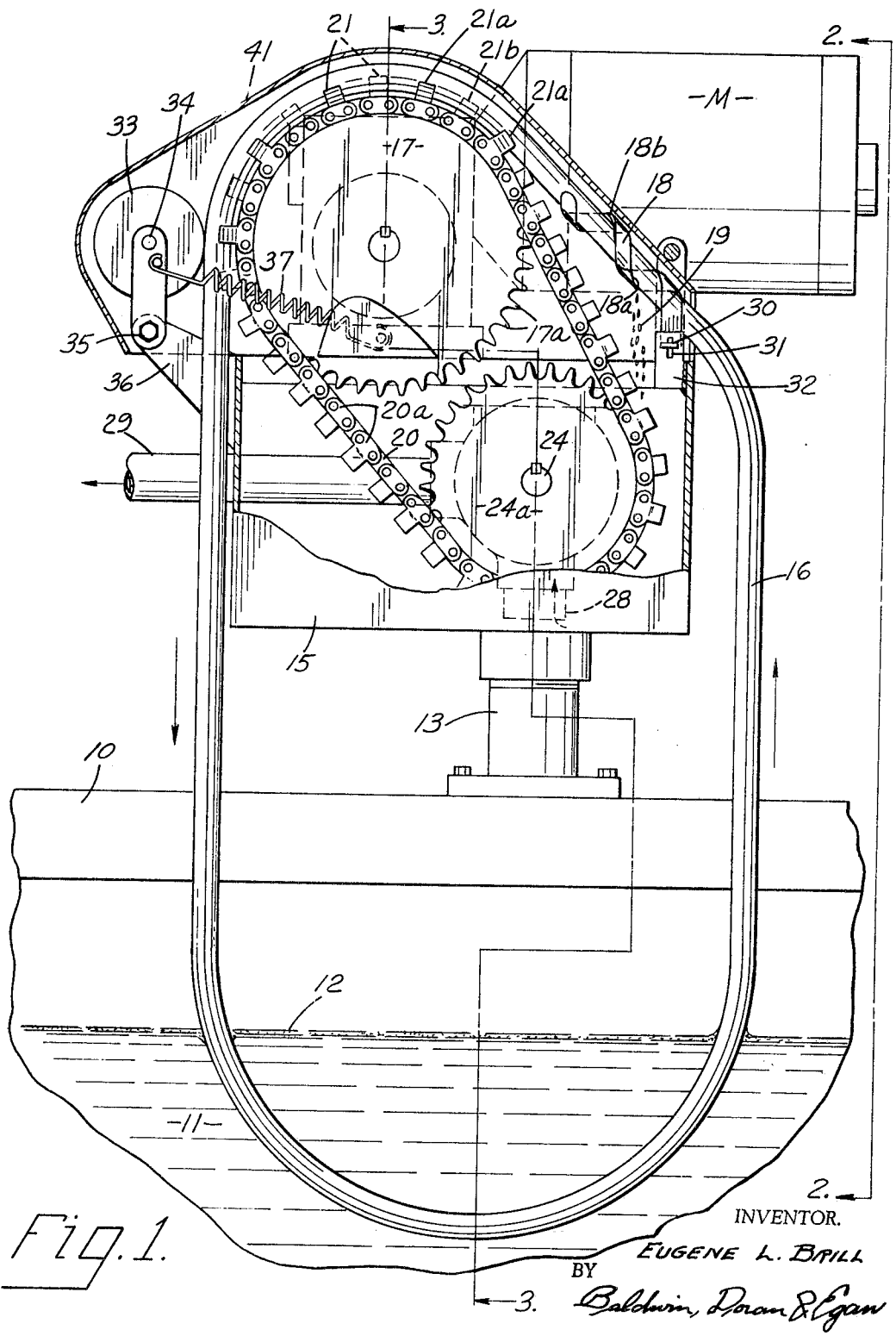
FIG. 1 is a side elevational view of one embodiment of this invention using a sprocket drive for an endless collector loop.
Figure 2:
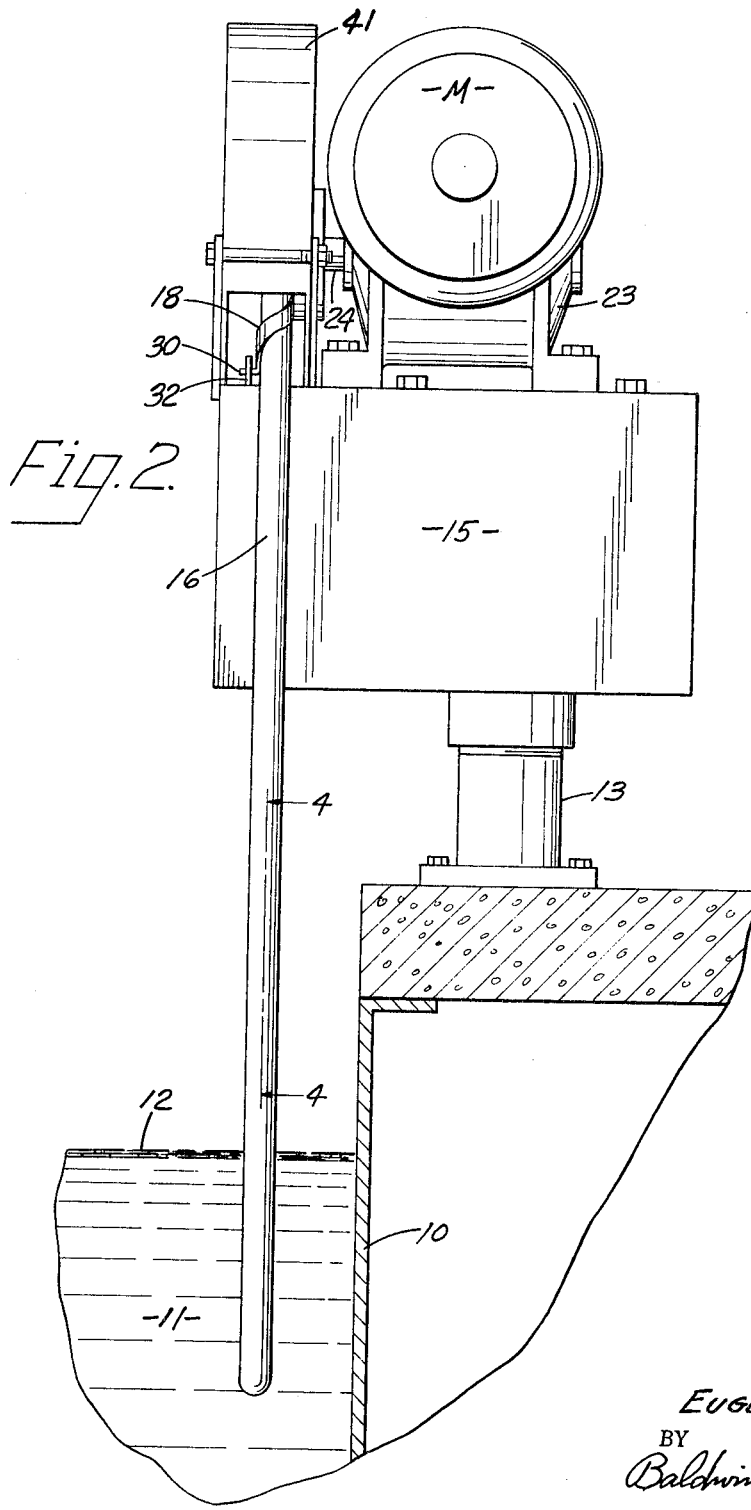
FIG. 2 is an end elevational view of FIG. 1 taken generally along the line 2—2 of FIG. 1.

FIG. 5 is a perspective view of the device of FIGS. 1 and 2 showing a collector loop of sufficient length to provide a portion of the loop floating on the liquid in the reservoir; while FIG. 6 is a perspective view of the device of FIGS. 1 and 2 providing a portion of the collector floating on the liquid in the reservoir adapted to form a generally circular coil on the liquid with the approaching portion of the loop overlying the departing portion of the loop.

Figure 3:
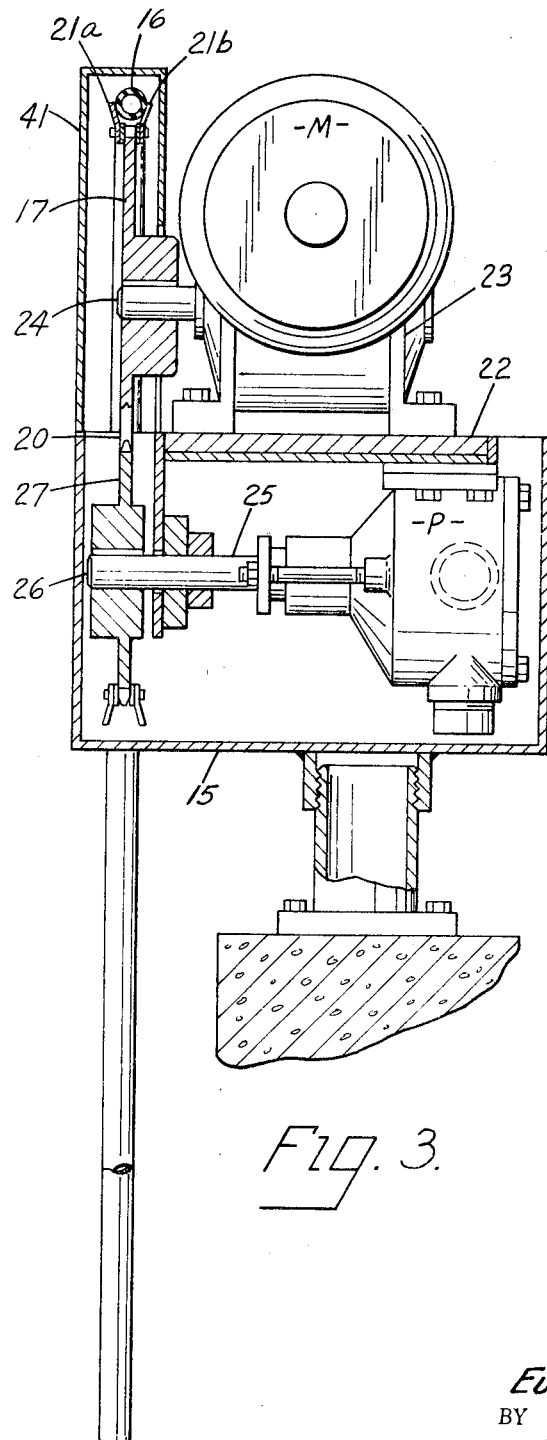
FIG. 3 is a sectional view taken along the line 3—3 of FIG. 1.

Referring to FIGS. 1 through 3, a reservoir 10 is illustrated as containing a liquid such as water 11 on which floats a layer 12 of oil or the like, this being intended to represent any of the layer materials hereinabove defined. Mounted on a wall of the reservoir 10 is a standard 13 which supports a collector tank 15 to receive the hydrophobic material carried by this invention from the floating layer 12 in the reservoir 10 by means of an endless generally cylindrical flexible collector loop 16 which is provided with drive means 17, 20 to pass the collector downwardly as seen at the left-hand side of FIG. 1 into the reservoir 10 and through the layer 12 and the water 11, then upwardly out of the reservoir through the layer 12 and upwardly in the direction of the arrow in the right-hand side of FIG. 1. Doctor blade means 18 is provided where the coated collector comes out of the reservoir 10 and this blade scrapingly engages the collector 16 so as to remove the material coating the collector which drops away as indicated at 19 into the collector tank 15. Beyond the doctor blade the collector loop passes over the drive pulley 17 for the next trip.

The drive pulley 17 in this embodiment is shown as a sprocket having teeth 17a adapted to engage drivingly with an endless chain 20 comprising a plurality of interconnected links 20a. The chain 20 is provided with driving flange teeth 21 operatively connected with the chain and extending outwardly from the periphery thereof at spaced points circumferentially thereof as it passes around pulley 17, these flange teeth diverging generally radially outwardly on opposite sides of the collector loop, as clearly seen in FIGS. 1 and 3 and spaced axially to firmly wedge the collector loop 16 between them, providing a positive drive of the collector 16. These driving flange teeth on one side of the collector loop are marked 21a and those on the opposite side 21b so that the collector loop passes around the driving element in a wavy line. As clearly seen in FIG. 1, every other chain link carries one of the driving flange teeth 21a and the intermediate links carry the teeth 21b. However, other arrangements of these driving flange teeth would be acceptable if the collector were bent in a wavy path around pulley 17 carrying the teeth 21a and 21b extending directly from the periphery of the pulley.

Drive pulley 17 is driven by electrical motor M suitably mounted on a base plate 22 and driving through reduction gearing 23 a shaft 24 which is drivingly connected with pulley 17 by sprocket 24a and chain 20.

It should be understood that in one form of this invention the drive pulley 17 need not have sprocket teeth but could be a plain cylindrical pulley bearing the driving flange members 21a and 21b and driven at its center by means of the shaft 24.

One of the advantages of the embodiment disclosed here is that the drive chain 20 may also be utilized to drive a pump P which is suitably supported from plate 22 in the collector tank 15 as clearly shown in FIGS. 1 and 3. This pump has its shaft 25 drivingly connected with shaft 26 which carries a sprocket wheel 27 which is operatively engaged with chain 20. Thus motor M drives both the collector loop 16 and pump P. The pump may have an intake 28 submerged in the hydrophobic material collected in tank 15 and a discharge pipe 29 to carry the pumped material to any suitable location.

The doctor blade means 18 is of a somewhat unusual character. It comprises a unitary flat strip of stiff material having a width greater than its thickness, which strip is bent in helical form with its width dimension being generally parallel to the axis of the helix. The edge of the strip 18a toward the approaching coated collector loop 16 scrapingly engages the collector, while the downstream edge of the helix as indicated at 18b is preferably spaced away from the collector loop. This arrangement gives a very effective scraping action to remove the collected material from the outer surface of the collector 16. One manner of securing the helical doctor blade 18 in position is the provision of a T-shape projection rigid with the blade 18 and indicated at 30. The member 30 when turned 90 degrees from the position shown in FIG. 1 will enter through a slot 31 in a holding bracket 32 secured to plate 22, after which a 90 degree rotation places the helical doctor blade means in the position of FIG. 1 where it is firmly held.

As clearly seen in FIG. 3, the collector loop 16 is wedgingly received between the driving flange members 21a and 21b. To aid in holding the collector loop in driving relation with the pulley 17, an idler pulley 33 is rotatably mounted on a shaft 34 which is oscillatable about a pivot 35 in a bracket 36 which is fixed to the tank 15. A suitable tension spring 37 urges the idler pulley 33 against the outer portion of collector loop 16 so that it remains drivingly engaged with sprocket pulley 17.

Figure 4:
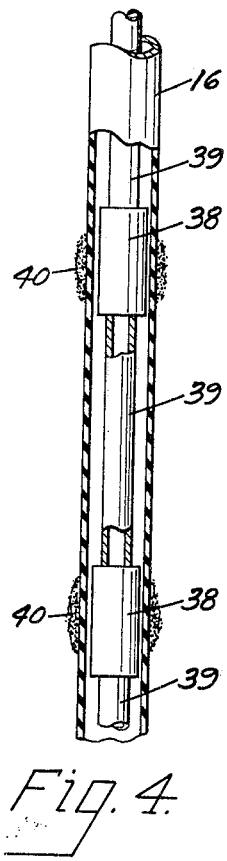
FIG. 4 is an enlarged sectional view taken generally along the line 4—4 of FIG. 2 and showing a modification of the invention.

The collector loop 16 could be a solid tube of rubber or rubber-like plastic synthetic material. In FIG. 3, this collector loop is shown in section and is here shown as a hollow tubular rubber-like member. Polyurethane has been very successfully used for this purpose. When the hose-like loop is welded to make a closed loop, the air trapped inside will cause the loop to float on water.

Where magnetic particles, such as small particles of steel, are found in the hydrophobic layer 12, a modified form of collector loop may be provided as shown in FIG. 4. Here the tubular collector loop 16' is provided at spaced intervals with magnets 38 which are here shown as permanent magnets. To keep them properly spaced inside of the tube 16' other tubular spacer members 39 may be provided in the interior of the tube 16'. The magnetic attraction will then cause metallic particles to adhere to the tubular member 16' at zones 40 just outside the magnets 38. A suitable cover 41 may be provided over the drive pulley, the idler pulley, the drive chain and the helical doctor blade.

Where the hydrophobic material is of such a great quantity that more than one of the collector loops 16 is necessary, they may be placed side-by-side in any number desired so long as there is room between loops so that each may fall in random orientations as described in connection with FIGS. 5 and 6.

This invention provides a device having a capacity for removing a large volume of hydrophobic material by a piece of equipment which occupies a very small space. This makes it very valuable in those places where large bulky equipment could not be used.

The above device, shown in FIGS. 1 through 3, when utilizing a collector loop of polyurethane or neoprene having about ¾ inch outside diameter and ½ inch inside diameter is of sufficient stiffness that the positive driving element will push the collector loop into the reservoir and lift it out on the return trip as clearly shown in FIG. 1.

FIG. 5 shows the device of FIGS. 1 through 3 mounted in such a manner and with such a length of collector loop 16 that a portion 160 thereof is permitted to float on the surface of the liquid 12 in the reservoir 10. In this arrangement, the mechanism inside the box 15 and the safety guard 41 is exactly like that shown in FIG. 1 and the sole support for the collector loop 16 is the chain 20 passing around pulley 17. Here this sole support was located about ten feet above the level of the liquid in the reservoir and sufficient length of the collector loop was provided so that about six feet was lying upon the water in the reservoir indicated at the portion 160. In this embodiment, the collector loop rolled or crawled over the top of the debris floating on the reservoir and picked the oil material over a wide area. The cylindrical, flexible hose-like character of the collector 16 enables it to wander at random over various portions of the surface of the liquid 12.

In another application of this invention, not illustrated here, the mechanism 13, 15, 41 as shown in FIG. 5 was mounted nearer the level of the water 12, say between three inches to five feet above the water level. The collector loop 16 then passed out more in a horizontal direction, its cylindrical cross section enabling it to bend down to the water surface in a smooth manner. This caused a loop of the collector 16 to float about on the surface of the water in the reservoir breaking up the pockets of debris and oil and allowing the tubular collector to continuously contact the oil. The sole support above the water for the collector flexible loop enabled this free movement of the loop about the surface of the liquid in the reservoir. The fact that the collector loop was hollow and floated kept it out of any submerged machinery and allowed it to float freely on the oil covering the surface of the liquid in the reservoir.

FIG. 6 shows another embodiment of this invention wherein the parts illustrated are like those in FIG. 5 with respect to the mechanism of FIGS. 1, 2 and 3 mounted in the box 15 and the safety guard 41 sitting on a standard 13 above the level 12 of water in the reservoir 10. Here, with the sole support of the collector loop 16 represented by the pulley 17 at about ten feet above the water level, and with a thirty foot length of collector loop 16 of ¾ inch outside diameter tube and ½ inch inside diameter, the collector loop was caused to roll out on floating debris, oil and grease at random orientations permitted by the cylindrical cross section of the flexible collector loop. Here the length of the collector loop floating upon the water in the reservoir was greater than that shown at 160 in FIG. 5. It was sufficient to form a generally circular coil 161 on the liquid with the approaching portion 162 of the collector loop overlying the departing portion 163 of the loop. In operation of this form of the device, every ten or fifteen seconds the pull of the driving element 17 upon the lower portion of the coil 161 caused this coil to flop over in the direction of the arrow A to fall temporarily into the position of the dot-dash line 161 which caused the collector loop to break up and pick up grease floating on the liquid 12. In cold weather, it is almost impossible to pick up grease by any other apparatus presently known to this inventor.

Where the level of the liquid 12 in the reservoir 10 varies from time to time, it is recommended that this device be set up to operate at the lowest expected level of liquid in the reservoir whereupon at higher levels the collector loop will form coils as hereinabove indicated and will operate satisfactorily.

For most applications of this invention, polyurethane tubing is preferred, primarily because of its high abrasion resistance and because it may be welded together very efficiently to form the endless loops required by this invention.

For use of this invention where high temperatures are involved, neoprene is preferred and this can be easily vulcanized into an endless loop.

I have, therefore, provided a drive element that positively drives the tube-like collector without tensioning devices or without gravity tension. This leaves that part of the tube which is below the driving element free to move in any direction. The drive connection between the driving element and the collector loop must not slip when the collector loop is coated with oil or grease. The cylindrical cross section of the flexible collector loop renders it capable of moving about in any direction so that the loop can float over a wide area where the oil or grease is to be collected.

What is claimed is:

1. Apparatus for collecting hydrophobic material from a layer of the same floating on a liquid reservoir comprising a single separate endless loop of an elongated flexible generally cylindrical collector of substantially uniform diameter having attraction for the hydrophobic material, drive means for passing said collector into said reservoir beneath said layer and then upwardly and out through said layer whereby said layer material is coated on the surface of said collector, said last named means including sole support means located wholly above the liquid in said reservoir, whereby the cylindrical collector is free to move about the reservoir in a random manner, means engaging said coated collector for removing said material therefrom, and means preventing material removed by said collector engaging means from returning to said reservoir.

2. Apparatus as defined in claim 1, wherein said endless loop collector is of a density capable of floating on the surface of said liquid reservoir.

3. Apparatus as defined in claim 2, wherein said endless loop is a hollow tube having air trapped therein.

4. Apparatus as defined in claim 1, wherein said means for passing said collector into said reservoir includes drive means for positively gripping said collector and pushing the same toward said reservoir.

5. Apparatus as defined in claim 4, wherein said collector has sufficient stiffness to penetrate below the surface of said reservoir when pushed theretoward at an angle to the surface of said reservoir.

6. Apparatus as defined in claim 1 wherein said material removing means comprises a doctor blade in the form of a helix wrapped around said collector between its exist from said reservoir and its return to said drive means.

7. Apparatus as defined in claim 4, wherein said drive means includes a pulley having driving flange teeth operatively connected with said pulley and extending radially outwardly from the periphery thereof at spaced points circumferentially thereof, said flange members diverging generally radially outwardly on opposite sides of said collector and spaced alternately on opposite sides of the collector to firmly wedge said collector between them.

8. Apparatus as defined in claim 1 wherein said material removing means is a doctor blade formed as a fixed unitary flat strip having a width greater than its thickness, said strip being of helical form with its width dimension being generally parallel to the axis of the helix, and the edge of said strip toward the approaching coated collector being closer to said collector than the other edge of said strip, said strip being positioned around said collector.

9. Apparatus as defined in claim 7, wherein said pulley has sprocket teeth about its circumference, a drive chain having interconnected links drivingly engaging said sprocket teeth, and said driving flange teeth rigidly connected with said links, said flange teeth diverging generally radially outwardly from said links with said flange teeth alternately on opposite sides of said collector loop as it passes around said pulley to firmly wedge said collector loop between them, and means for driving said chain.

10. Apparatus as defined in claim 8, including a collection pan positioned to receive hydrophobic material scraped from said collector loop by said doctor blade, and pump means for removing liquid from said collector pan and drivingly engaged by said drive means.

11. Apparatus as defined in claim 2, wherein said loop is of sufficient length, relative to the height of said sole support means above said reservoir, to provide a portion of said loop floating on the liquid in said reservoir.

12. Apparatus as defined in claim 2, wherein said loop is of sufficient length, relative to the height of said sole support means above said reservoir, to provide a portion of said loop floating on the liquid in said reservoir, adapted to form a generally circular coil on the liquid with the approaching portion of the loop overlying the departing portion of the loop.

References Cited

UNITED STATES PATENTS

| 2,866,827 | 12/1958 | Jurgeleit et al. | |
| 3,314,545 | 4/1967 | Grabbe et al. | 210—396 X |

FOREIGN PATENTS

| 122,311 | 9/1918 | Great Britain. |

REUBEN FRIEDMAN, Primary Examiner

J. W. ADEE, Assistant Examiner

U.S. Cl. X.R.

210—400